(12) United States Patent  
Savant

(10) Patent No.: US 6,502,728 B2
(45) Date of Patent: Jan. 7, 2003

(54) ATV CARRIER RACK

(76) Inventor: Kevin D. Savant, P.O. Drawer 520, Kinder, LA (US) 70648

( * ) Notice: Subject to any disclaimer, the term of this patent is extended or adjusted under 35 U.S.C. 154(b) by 4 days.

(21) Appl. No.: 09/833,899

(22) Filed: Apr. 11, 2001

(65) Prior Publication Data

US 2002/0148867 A1 Oct. 17, 2002

(51) Int. Cl.⁷ .................................................. B60R 9/00
(52) U.S. Cl. ................. 224/401; 224/42.32; 224/42.38; 224/539
(58) Field of Search ................................ 224/401, 408, 224/42.32, 42.33, 42.38, 539; 180/210, 215

(56) References Cited

U.S. PATENT DOCUMENTS

| | | | | |
|---|---|---|---|---|
| 4,176,771 A | * | 12/1979 | Dubroc, Sr. | 224/401 |
| 4,247,030 A | * | 1/1981 | Amacker | 180/210 |
| 4,277,008 A | * | 7/1981 | McCleary | 224/401 |
| 4,300,706 A | * | 11/1981 | Hendrick et al. | 180/210 |
| D276,330 S | * | 11/1984 | Stahel | D12/407 |
| 4,826,057 A | * | 5/1989 | Yamada | 180/215 |
| 5,076,387 A | * | 12/1991 | Oka | 180/215 |
| 5,236,062 A | * | 8/1993 | Laney | 182/116 |
| 5,433,357 A | * | 7/1995 | Alliff | 224/410 |
| D364,140 S | * | 11/1995 | Gustavsen | D12/107 |
| 5,573,162 A | * | 11/1996 | Spencer et al. | 224/401 |
| 6,016,943 A | * | 1/2000 | Johnson et al. | 224/401 |
| 6,179,180 B1 | * | 1/2001 | Walker | 224/401 |
| 6,378,748 B1 | * | 4/2002 | Cox | 224/401 |

* cited by examiner

Primary Examiner—Lee Young
Assistant Examiner—Maerena W. Brevard

(57) ABSTRACT

An accessory type carrier rack extension adapted for easy attachment to existing tubular racks generally provided on all terrain vehicles. The rack is provided in a variety of models to mate with and compliment existing tubular carrier racks and may be provided with flattened expanded metal panels that may be slotted at assembly to fit around any protrusions on the existing carrier rack that may exist but are unaccounted for by the manufacturer. The accessory carrier rack includes a tubular base frame fabricated from bent tubular members and various truss members. Some of the truss members are positioned parallel to the bent tubular members and/or parallel to adjacent truss members in a manner that defines elongated slots for adjustable positioning of the accessory carrier rack relative to an existing carrier racks generally found on ATVs. The slots are used for passing a retaining bolt through to engage a "C" shaped collar to be fitted over the tubular bars of an existing carrier at strategic points, thereby allowing a wide positioning capability. This arrangement allows the accessory carrier to be produced in large numbers for easy adaptation to a wide variety of existing bar racks with fewer custom made adapter brackets.

6 Claims, 2 Drawing Sheets

ATV CARRIER RACK

BACKGROUND OF THE INVENTION

1. Field of the Invention

This invention relates generally to the field of vehicle luggage or carrier storage racks especially for all terrain vehicles (ATVs), and more particularly to a carrier accessory that is adaptable to existing vehicle storage racks.

2. General Background

Recreational or all terrain vehicles (ATV's) are becoming increasingly popular as a mode of transportation, particularly for various types of off-road activities. Typically, an ATV is equipped with a carrier or storage rack of some type, integrally mounted at the rear of the vehicle. The rack generally consists of a horizontally supporting area made up of a series of tubular steel members spaced in a manner that allows various items, such as tents, guns, containers and other such field equipment, to be attached thereto using cords and the like for lashing for removable attachment to the rack.

A number of specialty racks have been designed for transporting various types of equipment and or animals, such as U.S. Pat. Nos. 6,016,943, 4,176,771, 4,247,030, 4,826,057, U.S. Pat. No. Des. 276,330, Des. 364,140 as well as add on accessory items such as U.S. Pat. Nos. 5,433,357 and 6,179,180.

Some such designs are applicable only to three-wheel vehicles, while others may be used for four-wheel ATV's. In most case these racks are mountable to the vehicle frame or to the fenders. In any case, to mount a specialty rack, original equipment rack must normally be removed and the new specialty rack installed, thereby increasing cost.

In some cases, such as in U.S. Pat. No. 6,016,943, it has been shown that a molded horizontal carrier surface having numerous slots therein is desirable over the more common tubular racks. Such racks certainly provide a more versatile means for securing objects to the rack. However, such molded racks are still mounted directly to the vehicle. There is no indication that such molded racks are designed to be mounted to an existing carrier rack.

It is becoming customary to provide removable custom made accessory extension racks that adapt readily to existing ATV carrier racks, thereby providing versatility and reducing cost. Adaptation of such accessory racks to the numerous styles of existing racks is a major problem requiring a wide range of predrilled holes, brackets, straps, and fasteners. In many cases custom-made adapter flanges are necessary. Therefore, there is a need for a more versatile mounting arrangement for adapting accessory type extender racks to ATV conventional bar racks.

SUMMARY OF THE INVENTION

Described herein is an accessory-type carrier rack extension adapted for attachment to existing tubular racks generally provided on all terrain vehicles. The rack is provided in a variety of models to mate with and compliment existing tubular carrier racks and is provided with flattened expanded metal panels that may be slotted at assembly to fit any protrusions on the existing carrier rack that may exist but are unaccounted for by the manufacturer. The accessory carrier rack includes a tubular base frame fabricated from bent tubular members and various truss members. Some of the truss members are positioned parallel to the bent tubular members and/or parallel to adjacent truss members in a manner that defines elongated slots for adjustable positioning of the rack relative to an existing carrier rack. The slots are used for passing a retaining bolt through to engage a "C" shaped collar to be fitted over the tubular bars of an existing carrier at strategic points. This arrangement allows the accessory carrier to be produced in large numbers for easy adaptation to a wide variety of existing bar racks with fewer custom-made adapter brackets.

BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein.

DETAILED DESCRIPTION OF THE PREFERRED EMBODIMENT

The general practice for constructing an ATV carrier rack consists of fabricating same from steel tubing and fitting with the necessary brackets and supports for attachment to the vehicle in a manner to provide the structural strength sufficient to carry the desired loads rated for the vehicle. On occasion simply securing a container or other objects to the bar rack with ropes and elastic ties is either insufficient or is an inefficient method for transporting the workload. In such cases it may be necessary to secure a second bar rack having a wider or extended horizontal area or a more plainer surface. In such cases the accessory rack is often custom fitted to the existing carrier rack by fabricating adaptive fittings and or drilling additional holes into the vehicle or existing carrier rack.

Figure 1:
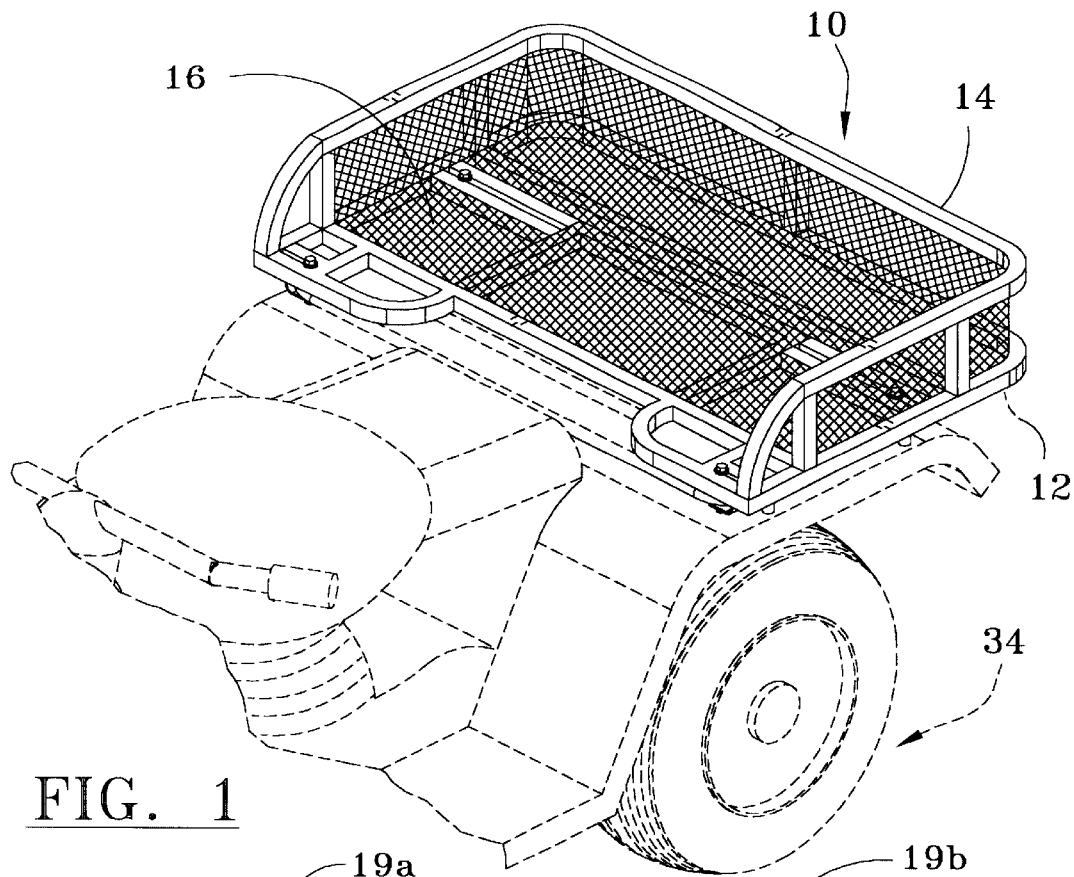
FIG. 1 is an isometric view of the preferred embodiment or the accessory rack as adapted to an ATV.

To simplify such adaptation it has been found that by constructing an accessory bar rack 10, as illustrated in FIG. 1, wherein the base frame 12 is constructed from tubular steel members. The base frame 12 in this case is also fitted with an upper railing 14. The base frame 12 and the space between the base frame 12 and the upper railing 14 is then covered by flattened expanded metal 16.

Figure 2:
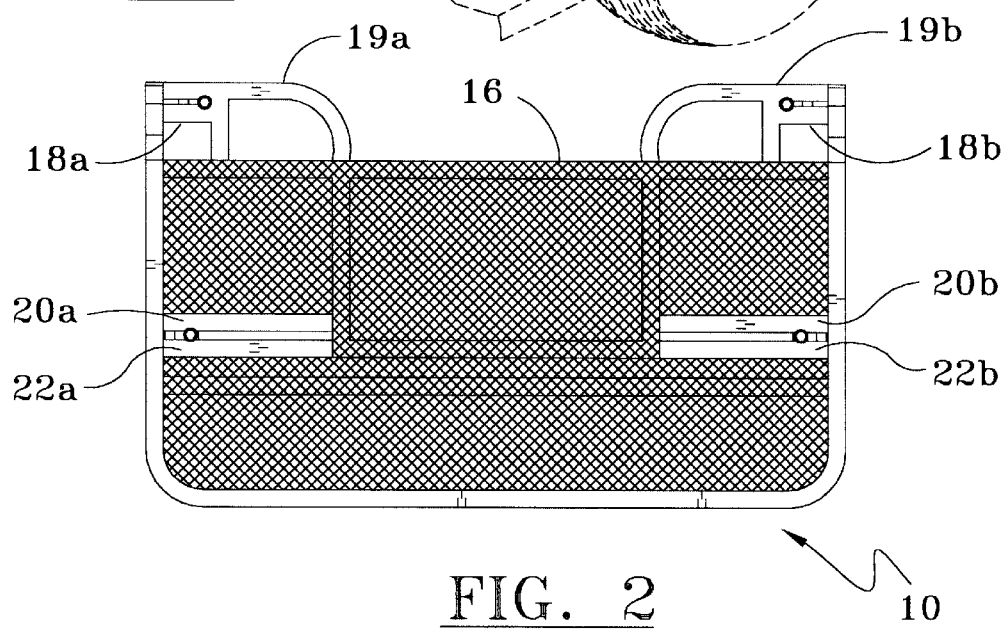
FIG. 2 is a top view of the versatile accessory rack.
Figure 3:
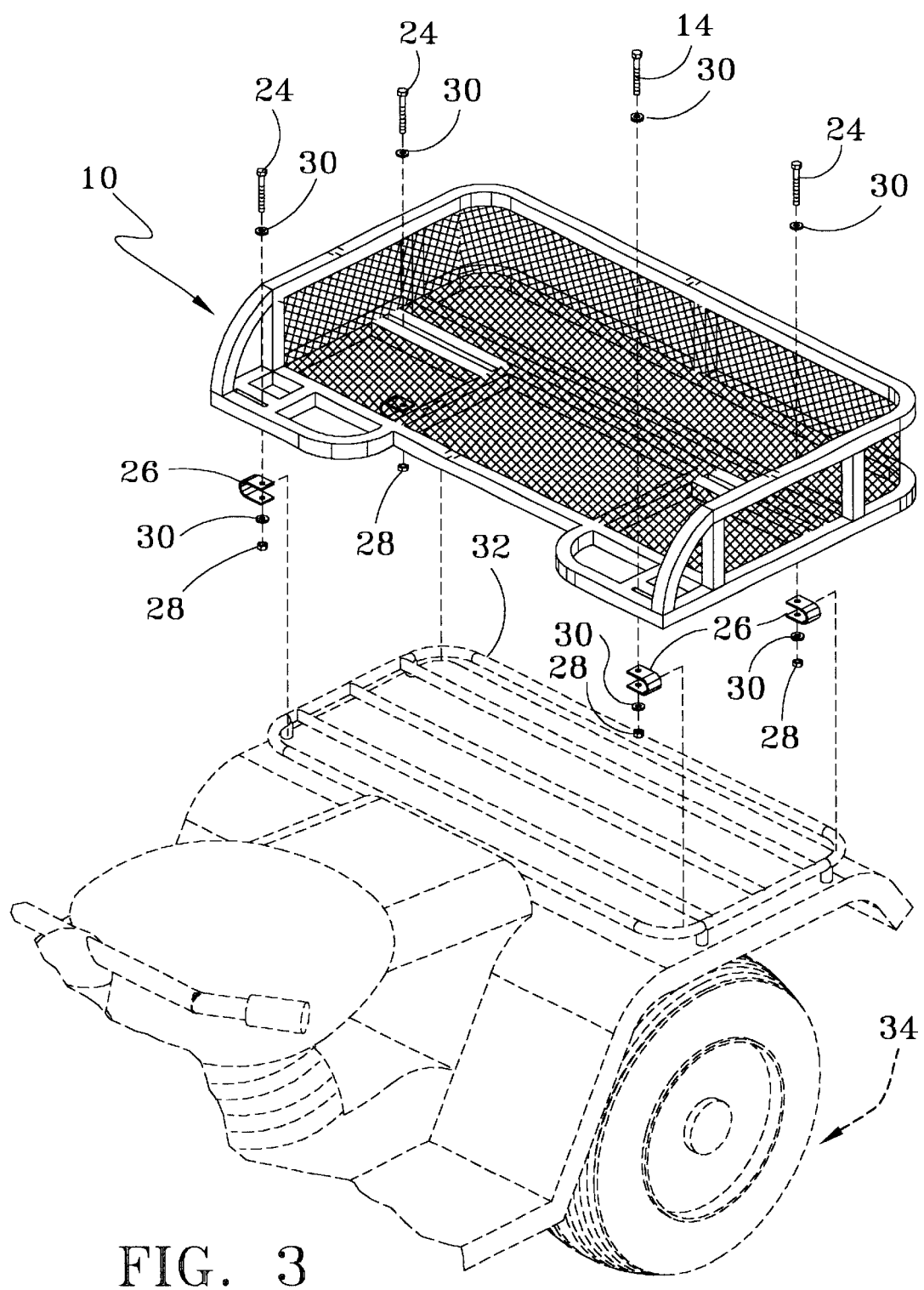
FIG. 3 is an exploded view of the accessory rack and its mounting clips and fasteners.

Versatile adaptation is achieved by the addition of the frame or truss members 18a, 18b, 20a and 20b running parallel to structural frame members 19a, 19b and 22a, 22b, as shown in FIG. 2, forming a slot there between at strategic points. The slot having a width sufficient for bolt 24 to pass through a washer 30 and the frame 12 and engage the "C" shaped tubular collar 26 and threadably secured by nuts 28 in the manner shown in FIG. 3. This allows the bolt 24 and its "C" shaped collar 26, having holes therein for receiving a bolt, to more likely align with a bar member in the existing bar rack 32 generally provided on an ATV 34.

By placing a second bar adjacent the main structural members as disclosed above, any number of accessory rack configurations may be provided for attachment to existing carrier racks with a minimum number of attachments. The expanded flattened metal sheet 16 may formed and pre-slotted or punched as necessary to accommodate any known raised projections on existing carrier racks 32. Obviously, additional slots maybe made at assembly to accommodate any unforeseen obstruction.

The above described method of construction allows pre-fabricated accessory carrier racks to be adapted to existing ATV carrier racks, thereby reducing the expense of removing the existing carrier rack from the vehicle and the need to fully structurally support and adapt the accessory rack to the vehicle frame.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

What is claimed is:

1. An ATV accessory carrier extension rack adapted for attachment to existing tubular carrier racks generally provided on all terrain vehicles said rack comprising:
   a) a tubular base frame comprising a plurality of structural bent frame members and truss bars in welded communication, a plurality of said truss bars positioned in parallel with said frame members in a manner that defines an elongated slot at strategic points;
   b) a railing defining the perimeter of said tubular base frame attached to said base frame in a spaced apart relationship and supported by a plurality of columns;
   c) a plurality of flattened expanded metal panels attached to said base frame and said railing; and
   d) a plurality of clamping collars and elongated fasteners for securing said tubular base frame at strategic points defined by said elongated slots in said tubular base frame to an existing tubular carrier rack previously attached to an ATV.

2. The ATV accessory carrier extension rack according to claim 1 wherein said accessory carrier rack is slidably adjustable relative to said existing carrier rack.

3. The ATV accessory carrier extension rack according to claim 1 wherein said expanded metals panels are installed after assembly of said accessory rack with said existing carrier rack, said metal panels being custom formed and slotted to fit over existing protrusions on existing carrier racks generally provided on ATVs.

4. The ATV accessory carrier extension rack according to claim 1 wherein said clamp collar is a C-shaped clamp having holes for receiving said elongated threaded fastener.

5. The ATV accessory carrier extension rack according to claim 1 wherein a portion of said base frame extends beyond said existing carrier rack.

6. A method of adapting an ATV accessory carrier rack having a tubular base frame for mounting to an existing ATV carrier rack having a tubular frame, the method comprising the steps of:
   a) providing an accessory type carrier extension rack having a tubular base frame comprised of fabricated structural members;
   b) adding additional bars as necessary to said tubular base frame in parallel with said fabricated structural members in a spaced apart manner whereby slots are formed there between which generally coincide with the tubular frame members of an existing ATV carrier rack at strategic points;
   c) providing a plurality of clamping collars for attachment to said existing ATV carrier rack;
   d) attaching said clamping collars to tubular frame of said existing ATV carrier rack at said strategic points;
   e) passing an elongated threaded fastener through each of said slots and said clamping collars;
   f) securing said fasteners in a manner whereby said accessory carrier rack is anchored securely to said existing ATV carrier rack.

* * * * *